United States Patent [19]
Ujiie

[11] 3,914,851
[45] Oct. 28, 1975

[54] METHOD FOR MANUFACTURING CURVED WALL METALLIC OBJECTS

[75] Inventor: Akira Ujiie, Kobe, Japan

[73] Assignee: Mitsubishi Jukugyo Kabushiki Kaisha, Tokyo, Japan

[22] Filed: May 1, 1974

[21] Appl. No.: 466,062

Related U.S. Application Data

[62] Division of Ser. No. 281,761, Aug. 16, 1972, Pat. No. 3,841,383.

[30] Foreign Application Priority Data

Aug. 25, 1971  Japan .............................. 46-64365

[52] U.S. Cl. .................... 29/412; 29/527.6; 164/52
[51] Int. Cl.² .................. B23K 31/02; B22D 27/02
[58] Field of Search .......... 164/52, 85, 252; 219/76; 29/484, 527.6

[56] References Cited
UNITED STATES PATENTS

| | | |
|---|---|---|
| 1,946,494 | 2/1934 | Horton .............................. 29/484 X |
| 3,433,926 | 3/1969 | Dick ................................. 219/73 X |
| 3,558,846 | 1/1971 | Ujiie ..................................... 219/76 |

FOREIGN PATENTS OR APPLICATIONS 57,162    8/1967    Germany .............................. 219/76

Primary Examiner—Francis S. Husar
Assistant Examiner—John E. Roethel
Attorney, Agent, or Firm—Cushman, Darby & Cushman

[57] ABSTRACT

The present invention relates to a method of manufacture of hemispherical end plates to be adhered to the opposite ends of a cylindrical pressure container, or spherical containers, especially smaller and thick-walled spherical pressure containers such as, for example, mixing spheres to be used for a generator boiler, distributor spheres, spherical containers for storing liquid hydrogen, etc.

4 Claims, 8 Drawing Figures

U.S. Patent  Oct. 28, 1975  Sheet 1 of 3  3,914,851
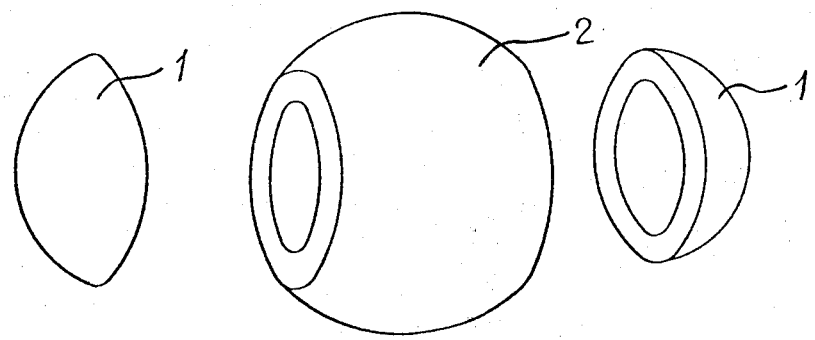
FIG. 1
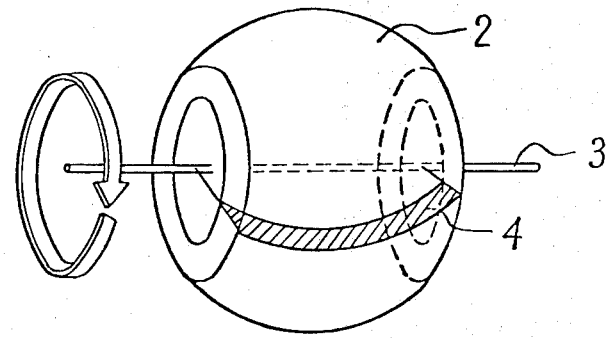
FIG. 2
FIG. 3
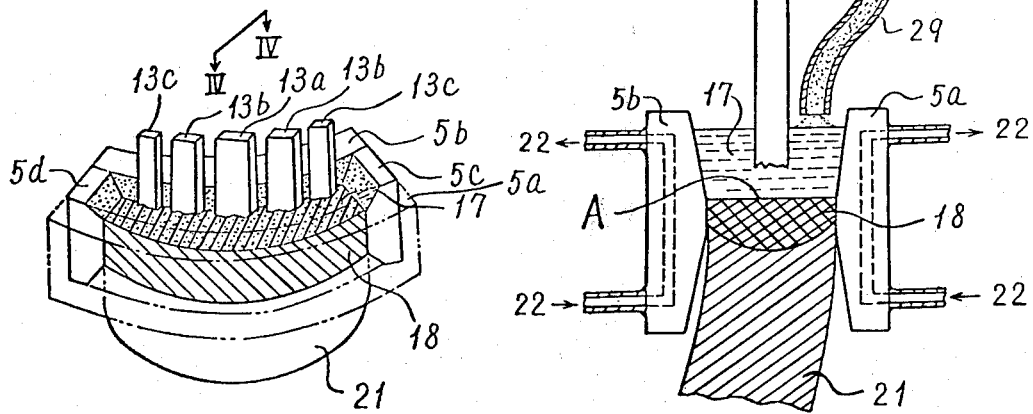
FIG. 4
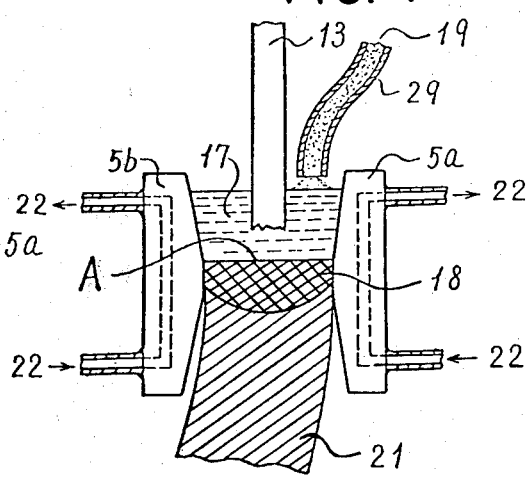

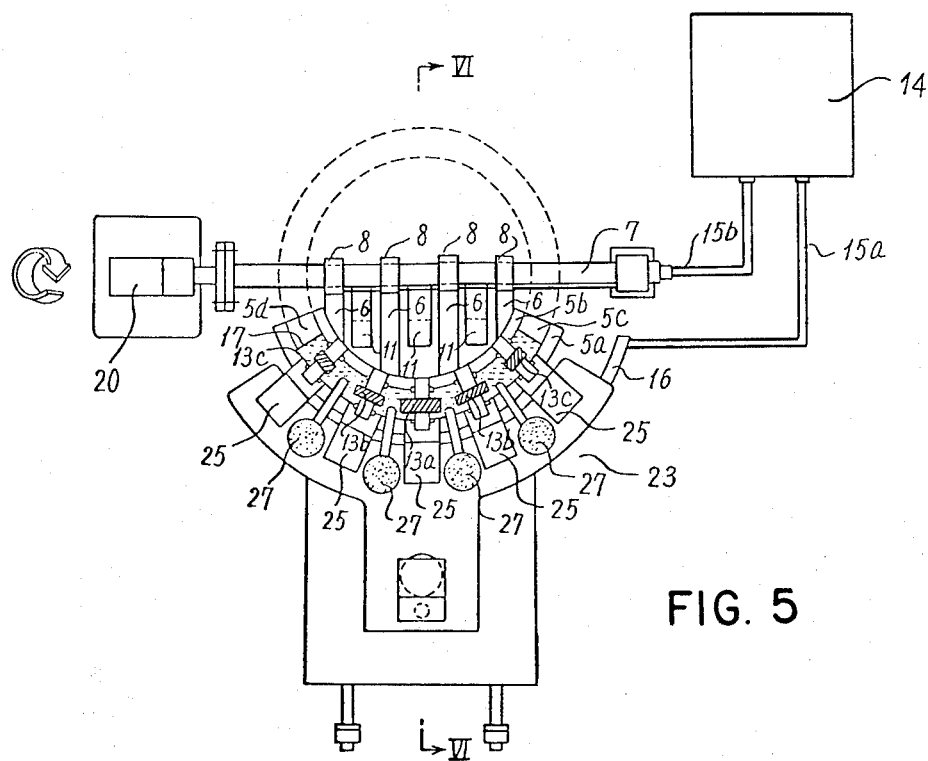
FIG. 5
FIG. 6
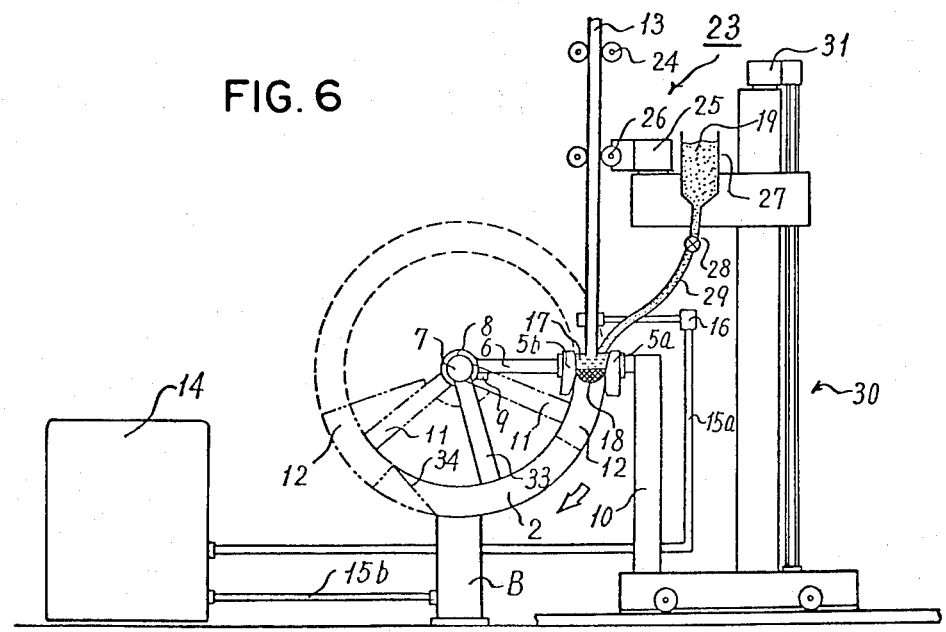

METHOD FOR MANUFACTURING CURVED WALL METALLIC OBJECTS

This is a division, of application Ser. No. 281,761 filed Aug. 16, 1972, now U.S. Pat. No. 3,841,383.

BACKGROUND OF THE INVENTION

Heretofore, the hemispherical end plates for cylindrical pressure containers were manufactured through deep press work at a high temperature of thick plates or through casting, while the spherical containers were manufactured by welding together two hemispherical members formed through deep press work at a high temperature of thick plates, or by welding together two hemispherical cast bodies.

However, in the case of either hemispherical end plates or spherical containers, if a thick plate is formed into a hemisphere through deep press work, then not only alot of expense is required for preparation of the metallic mould, but also there is a risk of causing defects in the quality of the products, and further, since the thickness of the different parts of the thus manufactured product would become uneven and it is required to correct into uniform thickness through machining, there exist disadvantages that not only much labor is necessitated but also it results in much loss of material, and that upon forming into a spherical container alot of labor is required resulting in increase of the working expense. On the other hand, if casting is employed, then there are disadvantages that the quality of the products is uneven, that the yield is low, and that upon forming a spherical container alot of labor is required for the welding work. Thus, in either case, there are common disadvantages that the manufacturing cost of the products is enhanced, and that products of high quality cannot be easily obtained.

SUMMARY OF THE INVENTION

The present invention has been proposed with an object of providing a method of manufacture which obviates the above-described disadvantages of the prior art method and which enables one to obtain hemispherical end plates or spherical containers of excellent quality with ease and at low cost; and it relates to a method of manufacture of drum-shaped members including the steps of continuously feeding electrode elements made of metallic material as well as flux into a metallic mould body defining a hollow space which has a horizontal cross-section such that when said cross-section is revolved about a horizontal center axis it may trace a locus of a desired dimension of spherical shell, leading a welding electric current through the slag bath portion in said hollow space to continuously form deposited metal within said metallic mould body according to an electroslag re-melting process, and continuously drawing said deposited metal along said locus of spherical shell to obtain a drum-shaped member consisting of said deposited metal, and a method of manufacture of cup-shaped members by cutting out said cup-shaped member from said drum-shaped member; whereby drum-shaped members and cup-shaped members of excellent quality may be manufactured with ease and at low cost.

The present invention also relates to a method of manufacturing spherical containers including the steps of continuously feeding electrode elements made of metallic material as well as flux into a metallic mould body defining a hollow space which has a horizontal cross-section such that when said cross-section is revolved about a horizontal center axis it may trace a locus of a desired dimension of spherical shell, leading a welding electric current through the flux portion in said hollow space to continuously form deposited metal within said metallic mould body according to an electroslag re-melting process, continuously drawing said deposited metal along said locus of spherical shell to obtain a drum-shaped member consisting of said deposited metal, then cutting away two cup-shaped members of the same dimension from said drum-shaped member, and forming between these two cup-shaped members a drum-shaped member consisting of said deposited metal through the steps similar to the aforementioned steps so that the respective members may be welded with each other to obtain a spherical container, and a method of manufacture of hemispherical end plates by severing said spherical container; whereby spherical containers and hemispherical end plates of excellent quality may be manufactured with ease and at low cost.

The principles of the invention will be further hereinafter discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the drawings:

FIGS. 1 and 2 show diagrammatic views for explaining the basic concept of the present invention; and FIGS. 3 through 8 show one preferred embodiment of means for carrying out the present invention, FIG. 3 being a perspective view for explaining the state in which deposited metal has been formed within a metallic mould body;

FIG. 4 being a cross-sectional view taken along line IV—IV of FIG. 3;

FIG. 5 being a plan view partially in cross-section;

FIG. 6 being a side view partially in cross-section;

FIG. 7 being a diagrammatic view for explaining the mode of formation of a drum-shaped member; and FIG. 8 being a plan view partially in cross-section of a portion of the apparatus shown forming a spherical container.

GENERAL DISCUSSION OF PRINCIPLES OF THE INVENTION

Figure 7:
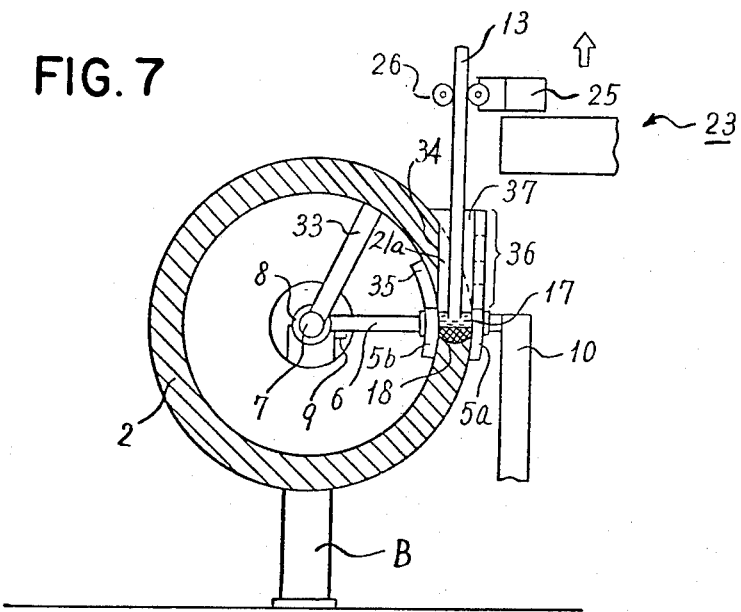

Now, prior to a detailed description of the present invention, the basic concept on which the present invention stands, will be explained with reference to the illustration in FIGS. 1 and 2. Severing a spherical container into three sections as shown in FIG. 1, it is severed into two cup-shaped sections 1 and one drum-shaped section 2. If these two cup-shaped sections 1 are selectively designed to have an appropriate relative dimension, then it is possible to obtain these cup-shaped sections 1 by cutting away them from said one drum-shaped section 2. Therefore, if it is desired to manufacture a hemispherical end plate or a spherical container of qualified deposited metal only, at first the drum-shaped section 2 is manufactured of deposited metal according to an electroslag re-melting process, then two cup-shaped sections 1 are cut out of said drum-shaped section 2, between these two cup-shaped sections is formed a drum-shaped section according to the same process as described above, and simultaneously therewith these respective sections are welded together to form an integral wall, whereby a spherical container may be obtained. As will be best seen in FIG. 2, if a horizontal cross-section area 4 of the severed drum-shaped section 2, where a plane containing the horizontal center axis 3 of said drum-shaped section 2 intersects with the inner and outer wall surfaces of said drum-shaped section 2, is revolved about said horizontal axis through 360°, then a locus of the spherical shell of said drum-shaped section 2 is formed. Therefore, a desired dimension of drum-shaped section made of deposited metal can be obtained, when a deposited metal body formed according to an electroslag re-melting process within a hollow space defined in a metallic mould is drawn along said locus of spherical shell, said hollow space having a horizontal cross-section such that when said cross-section is revolved about said horizontal axis 3 it may trade a locus of spherical shell of the desired dimension of drum-shaped section.

DETAILED DISCUSSION OF THE PRESENTLY PREFERRED EMBODIMENTS OF THE INVENTION

The present invention has been proposed on the basis of the aforementioned basic concept, and it will be described in more detail hereinunder with reference to FIGS. 3 through 8. In these figures, reference numeral 5 designates a water-cooled metallic mould body consisting of an outer mould piece 5a, inner mould piece 5b and side mould pieces 5c, 5d which are detachably jointed together, said metallic mould body being formed to define therein a hollow space A having a horizontal cross-section such that when said cross-section is revolved about a horizontal center axis 3 (FIG. 2) it may trace a locus of a desired dimension of spherical shell. The arrangement is such that through the inside of the respective metallic mould pieces of said metallic mould body may be passed coolant water 22, and that the upper and lower portions of the outer mould piece 5a and the inner mould piece 5b are provided with appropriate tapers as shown in FIG. 4. The upper taper is useful in case that electrode elements having a cross-section with larger thickness than the wall thickness of the products are employed and also for preventing sparks from occurring between the electrode elements and the metallic mould body 5 upon leading an electric current, while the lower taper is useful for smoothly drawing the deposited metal from the metallic mould body 5. Reference numeral 7 designates a rotary shaft that is horizontally and pivotably supported on a top end of pedestals B, and reference numeral 6 designates a plurality of arms having one end rotatably fitted to the rotary shaft 7 via a ring 8 and supported at a horizontal position by means of a stopper 9, the other end of each of said arms 6 supporting the inner mould piece 5b of said metallic mould body 5. Reference numeral 10 designates a support member for the outer mould piece 5a, and the metallic mould body 5 is horizontally supported by means of said plurality of arms 6 and said support member 10 (See FIG. 6). Reference numeral 11 designates a plurality of rotary arms having one end fixedly secured to the rotary shaft 7, a start piece 12 being mounted to the other ends of said arms, and said start piece 12 is adapted to block the lower side of a hollow space A within said metallic mould body 5 and to revolve along a locus of spherical shell of a drum-shaped section 2 to be formed while rotating together with the rotary shaft 7 (as shown by broken lines in FIGS. 5 and 6). In this connection, the above-referred inner metallic mould piece 5b, arms 6, rotary shaft 7 and the like are respectively formed of decomposable small parts so that the drum-shaped section 2 may be conveniently removed from the manufacturing apparatus after said section 2 has been formed. Reference numerals 13a, 13b and 13c designate electrode elements consisting of steel rods or wire-shaped metallic material having appropriate cross-section configurations (rectangular cross-section in the illustrated embodiment), said electrode elements being adapted to be fed vertically apart from each other at appropriate intervals to within the hollow space A in the metallic mould body 5 by means of a welding head 23 including a pair of guide rollers 24, a pair of feed rollers 26 driven by a feed motor 25 and the like for each electrode element 13a, 13b, or 13c, and said welding head 23 is supported from a manipulator 30 as described later. Reference numeral 27 designates a flux feeding hopper supported from the manipulator 30, and flux 19 contained within said hopper 27 is adapted to be continuously fed at an appropriate rate through a hose 29 provided with a flow rate regulating valve 28 into a slag bath 17 that has been preliminarily and separately prepared and poured into the hollow space A in the metallic mould body 5. Reference numeral 14 designates a power supply, numeral 15a designates a cable for connecting the power supply 14 with the respective electrode elements 13a, 13b and 13c via a connector 16, numeral 15b designates another cable for connecting the power supply 14 with the start piece 12. When a welding electric current is led from the power supply 14 through these cables 15a and 15b and the connector 16 between the respective electrode elements 13a, 13b and 13c and the start piece 12, an electroslag remelting phenomenon occurs within the hollow space A in the metallic mould body 5, in which the respective electrode elements 13a, 13b and 13c are successively molten from their tip end portion while they are gradually lowered owing to a Joule's heat generated in the slag bath 17, so that molten metal 18 is successively accumulated within said hollow space A, cooled and solidified by means of the metallic mould body 5, and continuously formed into deposited metal 21. Then the start end surface of said deposited metal 21 is deposited onto the top of the start piece 12, and so the deposited metal 21 is adapted to be drawn successively along the previously described locus of spherical shell in accordance with the rotation of said start piece 12 driven by the rotary shaft 7. Reference numeral 30 designates a manipulator provided with a motor 31, and said welding head 23 can be displaced up and down, forth and back, and left and right, and also can be rotated by means of said manipulator 30, so that the electrode elements 13a, 13b, 13c, etc. fed into the slag bath 17 by said welding head 23 may be correctly positioned within the hollow space in the metallic mould body 5. In the illustrated embodiment, the cross-section areas of the respective electrode elements 13a, 13b and 13c have been preliminarily selected through calculation in such manner that the area is maximum for the electrode element 13a at the center and the electrode elements 13b, 13c, etc. on the respective sides may be successively reduced in cross-section area, and these electrode elements are adapted to be fed at the same speed, so that the deposited metal may be uniformly formed at the respective portions within the hollow space A in the metallic mould body 5. Reference numeral 33 designates an arm having one end fixedly secured to the rotary shaft 7. As shown in FIG. 6, when the drawing of the deposited metal 21 by means of a start piece 12 has proceeded to a certain extent and the arm 11 and start piece 12 have been cut away in order to form a tapered portion 34 at the end of said deposited metal 21, said arm 33 serves to cause further drawing of the deposited metal 21 to proceed, and so the other end of said arm 33 is adapted to be connected to the deposited metal 21. Reference numeral 35 and 36 designate auxiliary metallic mould pieces mounted on the mould pieces 5b and 5a, respectively, of the metallic mould body 5. When the state shown in FIG. 7 appears just before the completion of formation of the drum-shaped section 2 with the deposited metal 21, said auxiliary metallic mould pieces 35 and 36 serve to form deposited metal in a hollow space section 21a between the tapered portion 34 at the extremity of the fused metal 21 and its rearmost portion and thereby complete the formation of the drum-shaped body 2.

Figure 8:
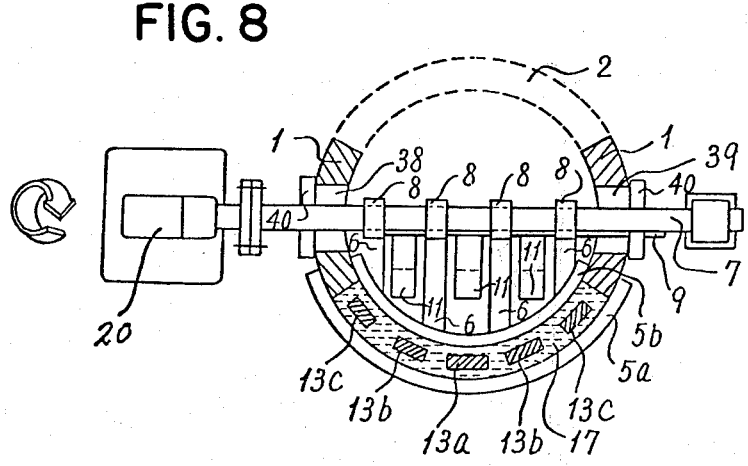

In FIGS. 7 and 8, reference numeral 37 designates an excess portion of the deposited metal formed within said auxiliary metallic mould 35–36, reference numerals 38 and 39 respectively designate penetrating openings provided at the centers of the two cup-shaped sections 1 that were cut out of a separate drum-shaped section 2, and numeral 40 designates a fixture piece for affixing said cup-shaped section 1 to the rotary shaft 7.

Upon manufacturing a hemispherical end plate or a spherical container by means of the above-described apparatus, after the lower side of the hollow space A in the metallic mould body 5 has been blocked by means of the start piece 12, the slag bath 17 is poured into said metallic mould body 5, then the manipulator 30 is appropriately operated to position the welding head 23 at an adequate location, the feed motor 25 is actuated to feed the respective electrode elements 13a, 13b, 13c, etc. into the slag bath 17 at an appropriate feed speed via the guide rollers 24 and the feed rollers 26, and an electric current is led between the respective electrode elements 13a, 13b and 13c and the start piece 12 from the power supply 14 through the cables 15a and 15b and the connector 16 while continuously supplying the flux 19 into the slag bath 17 from the hopper 27 through the hose 29 at a flow rate suitably regulated by the flow rate regulating valve 28. Then the respective electrode elements are molten into fused metal 18 owing to a Joule's heat generated in the slag bath 17, and said deposited metal is successively accumulated within the hollow space A in the metallic mould body 5. Said molten metal 18 is cooled and solidified by means of the metallic mould body 5 to successively form a deposited metal body 21, the lower end surface of said deposited metal body 21 being welded onto the upper end surface of the start piece 12. Since the start piece 12 is, in turn, revolved along the locus of spherical shell of the drum-shaped section 2 in the direction of the arrow in FIG. 6 by the intermediary of the rotary shaft 7 that is rotationally driven by the motor 20 as well as the arms 11, the deposited metal body 21 that is continuously formed within the metallic mould body 5 can be drawn continuously by the start piece 12 at an appropriate speed along said locus of spherical shell. In this case, the drawing speed is selected at a speed corresponding to the forming speed of the deposited metal body 21 within the metallic mould body 5. When the drawing of the deposited metal body 21 has proceeded to a certain extent in the above-described manner (that is, when the start piece 12 and arms 11 have reached in the proximity of the position indicated by double dot chain lines in FIG. 6), the arms 33 are connected to the deposited metal body 21, arms 11 are removed from the rotary shaft 7, and simultaneously therewith the start piece 12 and a part of the fused metal body 21 are cut away. Thereafter, the deposited metal body 21 is successively drawn by the arms 33 while retaining the tapered portion 34 at the extremity of the fused metal body 21.

When the deposited metal body 21 has been formed substantially over the entire circumference around the rotary shaft 7 as shown in FIG. 7, the rotation of the rotary shaft 7 is stopped and simultaneously therewith the welding head 23 begins to rise owing to an actuation of the motor 31. Then the slag bath 17, electrode elements 13a, 13b and 13c and the flux 19 are fed into the auxiliary metallic mould consisting of auxiliary mould pieces 35 and 36 and other auxiliary mould pieces disposed on the respective sides (not shown), said auxiliary metallic mould surrounding a hollow space 21a defined by the tapered portion 34 at the extremity of the fused metal body 21 and the rearmost end of the fused metal body 21, so that the electrode elements 13a, 13b and 13c are molten and solidified to fill said hollow space 21a with deposited metal while maintaining an electroslag re-melting phenomenon within said hollow space 21a. Thus the formation of the drum-shaped section 2 consisting of the deposited metal, has been completed.

In addition, the excess portion 37 that has been produced upon forming the deposited metal body within the hollow space 21a, is removed through suitable machining work, fusing-away work, or the like. The inner metallic mould piece 5b, arms 6, rotary shaft 7 and arms 33 contained inside of the drum-shaped section 2 that has been formed of deposited metal in the above-described manner, are removed from the inside of said drum-shaped section 2 by decomposing the respective members into smaller parts, and thereafter the drum-shaped section 2 is removed from the manufacturing apparatus. Then a drum-shaped member has been obtained. Subsequently, if any arbitrary shape of members are cut out of said drum-shaped member, cup-shaped members consisting of deposited metal can be obtained. When it is desired to manufacture a spherical container, two cup-shaped sections 1 of the same dimension are cut out of the drum-shaped section 2 that has been obtained according to the aforementioned process, and penetrating holes 38 and 39 are provided at the centers of the respective sections. Then, these respective cup-shaped sections 1 are fixedly secured onto the rotary shaft 7 via their penetrating holes 38, 39 and the fixture pieces 40 as opposed to each other coaxially with said rotary shaft and spaced apart at a distance substantially equal to the width of said drum-shaped section 2 (In this case, the respective members 6, 7, 33, arms 11, start piece 12 and the like that were previously decomposed and removed, are naturally restored to their original positions.), and the metallic mould body 5 is set so that the opposite end portions of the outer metallic mould piece 5a and the inner metallic mould piece 5b of the metallic mould body 5 may slidably abut against the outer edge portions of the cup-shaped sections 1 (However, in this case, the side metallic mould pieces 5c and 5d are omitted.). Subsequently, if the drum-shaped section is manufactured according to the same process as that described previously in connection to the manufacture of the drum-shaped section 2, then the opposite end surfaces of said drum-shaped section are welded onto the circumferential end surfaces of the cup-shaped sections 1 so as to form a spherical container consisting of an integral wall of spherical shell. After formation of the spherical container, the metallic mould 5b, arms 6, rotary shaft 7, arms 33 and the like contained within the container are decomposed and removed through the penetrating holes 38, 39 of the cup-shaped sections, and then said spherical container is taken out of the manufacturing apparatus. In addition, if necessary, the penetrating holes 38, 39 of the cup-shaped sections 1 are closed by welding members that have been cut out of the remainder of the drum-shaped section 2 from which said cup-shaped sections 1 were cut out, or by welding separately prepared members. In this way, a spherical container consisting of deposited metal can be obtained. Subsequently, if said spherical container is divided into two halves, hemispherical end plates consisting of deposited metal can be obtained.

In summary, according to the present invention, drum-shaped members, cup-shaped members, spherical containers or hemispherical end plates can be easily manufactured at an advantage over the prior art method relying upon press work of thick plates or casting work, in that products of excellent quality can be obtained at low cost.

It should now be apparent that the method for manufacturing curved wall metallic objects as described hereinabove possesses each of the attributes set forth in the specification under the heading "Summary of the Invention" hereinbefore. The method for manufacturing curved wall metallic objects of the invention can be modified to some extent without departing from the principles of the invention as they have been outlined and explained in this specification. The present invention should be understood as encompassing that which is within the spirit and scope of the following claims.

What is claimed is:

1. A method for manufacturing at least one curved wall metallic object comprising:
    a. continuously feeding metallic electrode elements and flux into a metallic mould body defining a hollow space having an arcuate horizontal transverse cross-sectional shape, while relatively rotating the object being formed with respect to the mould about a horizontal axis; while
    b. leading a welding current through the flux in said hollow space to continuously form deposited metal within said metallic mould body by electro-slag remelting; and
    c. continuously drawing said deposited metal along the path of said relative rotation to produce the curved wall metallic object,
    wherein the hollow space is of circular horizontal transverse cross-sectional shape and is of less than semicircular horizontal arcuate extent, the feeding, rotating and drawing being conducted so long as to produce a drumlike body of revolution resembling a hollow sphere lacking two opposite polar regional cup-like portions of less than hemispherical extent; and
    further comprising producing two cup-like, hollow, part-spherical metallic members complementing said drumlike body of revolution and peripherally securing them in place along opposite peripheral edges of the drum-like body of revolution to produce a hollow spherical body; each cup-like, hollow, part-spherical metallic member being produced by
    a. continuously feeding metallic electrode elements and flux into a metallic mould body defining a hollow space having an arcuate horizontal transverse cross-sectional shape, while relatively rotating the object being formed with respect to the mould about a horizontal axis; while
    b. leading a welding current through the flux in said hollow space to continuously form deposited metal within said metallic mould body by electro-slag remelting; and
    c. continuously drawing said deposited metal along the path of said relative rotation to produce the curved wall metallic object;
    the hollow space being of circular horizontal transverse cross-sectional shape and being of less than semicircular horizontal arcuate extent, the feeding, rotating and drawing being conducted so long as to produce a curved blank sufficiently extensive as to permit at least one of said cup-like, hollow, part-spherical metallic members to be cut therefrom; and
    d. cutting said at least one cup-like, hollow, part-spherical metallic member therefrom.

2. The method of claim 1 wherein the feeding, rotating and drawing are conducted so long as to produce a curved blank sufficiently extensive as to permit both of said cup-like, hollow, part spherical metallic members to be cut therefrom; and
    e. also cutting the second of the two cup-like, hollow, part-spherical metallic members from this same curved blank.

3. The method of claim 2 wherein the securing of the two cup-like, hollow, part-spherical metallic members along the opposite peripheral edges of the drum-like body of revolution is accomplished by welding.

4. The method of claim 3 further comprising severing the hollow spherical body about a great circle into two hemispherical bodies.

* * * * *